(12) United States Patent
Derriey et al.

(10) Patent No.: US 8,964,513 B2
(45) Date of Patent: Feb. 24, 2015

(54) TECHNICAL OR DECORATIVE PIECE ASSOCIATING A TRANSPARENT MATERIAL AND A SILICON BASED AMORPHOUS MATERIAL AND METHOD OF MANUFACTURING THE SAME

(75) Inventors: Gilles Derriey, Morteau (FR); Christian Verdon, Boussens (CH); Stewes Bourban, Ecublens (CH); Giancarlo Poli, Les Geneveys-sur-Coffrane (CH)

(73) Assignee: The Swatch Group Research and Development Ltd, Marin (CH)

( * ) Notice: Subject to any disclaimer, the term of this patent is extended or adjusted under 35 U.S.C. 154(b) by 1101 days.

(21) Appl. No.: 11/917,677

(22) PCT Filed: Jun. 1, 2006

(86) PCT No.: PCT/EP2006/005227
§ 371 (c)(1),
(2), (4) Date: Jul. 9, 2008

(87) PCT Pub. No.: WO2006/133810
PCT Pub. Date: Dec. 21, 2006

(65) Prior Publication Data
US 2009/0104409 A1  Apr. 23, 2009

(30) Foreign Application Priority Data
Jun. 14, 2005 (EP) .................................. 05012785
Apr. 3, 2006 (CH) ........................................ 0552/06

(51) Int. Cl.
G04B 19/06 (2006.01)
C03C 17/04 (2006.01)
G04B 19/12 (2006.01)

(52) U.S. Cl.
CPC .............. *G04B 19/065* (2013.01); *C03C 17/04* (2013.01); *G04B 19/12* (2013.01)
USPC .......................................... 368/232; 368/296

(58) Field of Classification Search
USPC .................. 368/232, 228, 233–237, 294, 296, 368/107–111
See application file for complete search history.

(56) References Cited

U.S. PATENT DOCUMENTS 4,435,090 A * 3/1984 Jaccard ........................... 368/32
4,534,660 A 8/1985 Laesser (Continued)

FOREIGN PATENT DOCUMENTS

| CH | 28539 | 7/1903 |
|---|---|---|
| CH | 690 518 A5 | 9/2000 |

(Continued)

OTHER PUBLICATIONS

International Search Report issued in corresponding application No. PCT/EP2006/005227, completed Aug. 3, 2006 and mailed Aug. 10, 2006.

(Continued)

*Primary Examiner* — Sean Kayes
(74) *Attorney, Agent, or Firm* — Griffin & Szipl, P.C.

(57) ABSTRACT

A transparent substrate (10) made of a transparent material resistant to temperatures higher than 500° C., such as sapphire, includes recesses (13, 14) in at least one of its faces (11, 12) and/or a groove (15) machined into its thickness, that are covered with opaque, translucent or transparent enamel depositions (23 to 30) that may or may not be colored, depending upon the pigments used in the enamel composition. The invention is applicable to a dial of a timepiece.

22 Claims, 4 Drawing Sheets

(56) References Cited

U.S. PATENT DOCUMENTS

| | | | |
|---|---|---|---|
| 4,599,251 A * | 7/1986 | Feller | 428/156 |
| 4,623,262 A * | 11/1986 | Gogniat et al. | 368/294 |
| 4,809,417 A * | 3/1989 | Normann, Jr. | 29/896.41 |
| 5,409,742 A * | 4/1995 | Arfsten et al. | 427/555 |
| 5,618,585 A | 4/1997 | Hechler et al. | |
| 5,760,367 A * | 6/1998 | Rosenwasser et al. | 219/121.69 |
| 6,207,285 B1 | 3/2001 | Sakoske et al. | |
| 6,525,300 B1 | 2/2003 | Mitra et al. | |
| 6,662,716 B2 * | 12/2003 | Benderly | 101/35 |
| 7,332,210 B2 * | 2/2008 | Arms et al. | 428/195.1 |
| 8,596,860 B2 * | 12/2013 | Verdon et al. | 368/296 |
| 2002/0184920 A1 | 12/2002 | Fossaluzza | |
| 2006/0062971 A1 * | 3/2006 | Bourban et al. | 428/172 |

FOREIGN PATENT DOCUMENTS

| | | |
|---|---|---|
| FR | 2 750 419 | 1/1998 |
| FR | 2 857 007 | 1/2005 |
| GB | 2032657 | 5/1980 |
| JP | 53-53360 | 5/1978 |

OTHER PUBLICATIONS

"Inclined," The American Heritage College Dictionary 687 (3d. Ed. 1993).

* cited by examiner

TECHNICAL OR DECORATIVE PIECE ASSOCIATING A TRANSPARENT MATERIAL AND A SILICON BASED AMORPHOUS MATERIAL AND METHOD OF MANUFACTURING THE SAME

This is a National Phase Application in the United States of International Patent Application No. PCT/EP2006/005227 filed Jun. 1, 2006, which claims priority on European Patent Application No. 05012785.1, filed Jun. 14, 2005 and Swiss Patent Application No. 00552/06, filed Apr. 3, 2006. The entire disclosures of the above patent applications are hereby incorporated by reference.

FIELD OF THE INVENTION

The present invention concerns a technical or decorative piece associating a transparent material resistant to temperatures higher than 500° C. and a silicon based material. It concerns more particularly a piece of this type including enamel depositions. The invention will be illustrated by way of example by a timepiece whose aesthetic appearance can be altered, and/or which could be structured to make parts of the movement or data displayed under the dial visible.

BACKGROUND OF THE INVENTION

Watches with mechanical movements, called "skeleton-watches", have been known for a long time. A Swiss Patent No. CH 28539 discloses a watch wherein the dial is made of a transparent material, such as glass, mica, or celluloid and allows the mechanism of the movement, and the plates and metal bridges to be seen. The hour symbols are added by any means to the visible surface of the dial. U.S. Pat. No. 4,534,660 and CH Patent No. 690 518 disclose even more "skeletal" watches. In U.S. Pat. No. 4,534,660, the top plate forming the crystal, the plates and the bridges, and the bottom plate form a pile made of a crystalline material, such as sapphire, said plates being machined with apertures or recesses for housing the parts of the movement, so as to make the entire watch mechanism visible. CH Patent No. 690 518 has the same objective, but with a single-piece transparent assembly cage made by ultrasound machining using a sonotrode. This latter document advises affixing the time symbols to the bezel to increase the aesthetic effect.

Between the oldest prior art where the dial is entirely opaque and the aforecited prior art where it is entirely transparent, with the exception of a few marking zones, there are no intermediate solutions for having quite wide opaque zones and complementary transparent zones or vice versa. The teaching of this prior art does not allow shades of colour to be created at the surface of the dial either.

SUMMARY OF THE INVENTION

It is therefore an object of the present invention to overcome the drawbacks of the aforecited prior art by providing a piece in which the association to two materials that have, to the best of the Applicant's knowledge, never been used together to produce a technical result or decorative effect, able to create transparent, opaque or translucent zones that may or may not be coloured.

The invention therefore concerns a piece for technical and/or decorative use, including a transparent substrate resistant to temperatures higher than 500° C. and including opaque, translucent or transparent depositions that may or may not be coloured, said depositions being formed by layers of enamel.

The transparent material resistant to temperatures higher than 500° C. may be a mono or polycrystalline material, for example a quartz, spinelle or corundum, particularly sapphire. An amorphous material can also be used, such as a mineral glass, provided that its softening point is higher than the temperature necessary for carrying out the enamel deposition.

According to another feature of the invention, the layers of enamel are deposited in recesses machined in at least one face of the substrate, the parts that do not have recesses also being able to be covered with enamel layers, or conversely, left bare, and thus transparent.

According to another feature of the invention, the enamel depositions are carried out in a groove machined into the thickness of the transparent substrate.

According to yet another feature of the invention, the enamel layers can be thick, or, conversely, thin or ultra thin and translucent, or even transparent, or opaque depending upon the pigments in the enamel composition.

According to yet other features of the invention, enamel layers of different colours can also be provided in the two faces of the transparent substrate or even in the groove. When the layers are translucent and have overlapping zones, this allows an additional colour or shade to be obtained.

BRIEF DESCRIPTION OF THE DRAWINGS

Other features and advantages of the present invention will appear more clearly in the following description of several embodiments, given by way of non-limiting illustration, with reference to the drawings, in which.

DETAILED DESCRIPTION OF THE INVENTION

Figure 1:
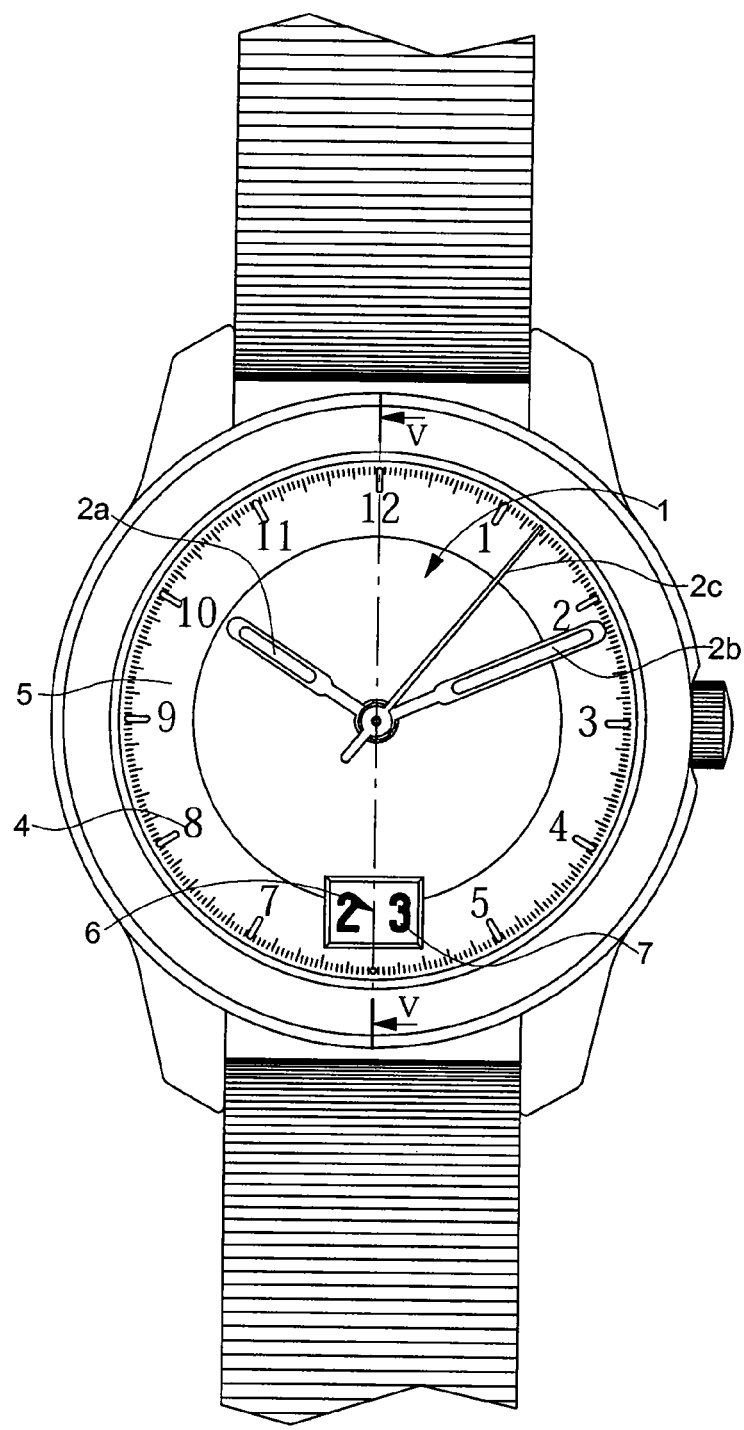
FIG. 1 shows a top view of a wristwatch incorporating a decorative and technical piece according to the invention.

With reference first of all to FIGS. 1 to 5, a first embodiment of a piece according to the invention will be described used to form the dial 1 of a wristwatch with an analogue display by means of hour hand 2a, minute hand 2b and second hand 2c moving opposite hour symbols 4 marked on an hour circle 5. In the example shown, dial 1 includes an aperture 6 passing through the entire thickness of dial 1 and below which there moves a date disc 7.

Figure 4:
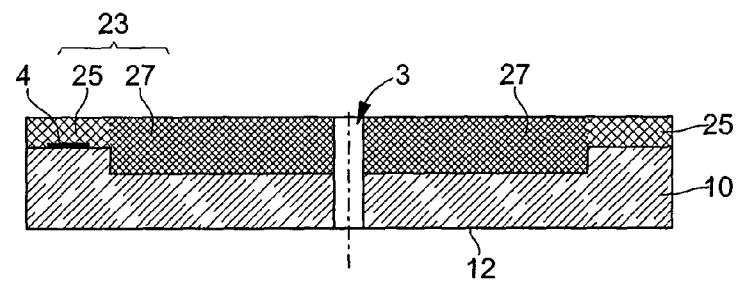

Dial 1 is shown in cross-section in FIG. 4 along the 6 o'clock-12 o'clock line, the scale along the thickness being greatly exaggerated for better comprehension of the drawings. The dial is formed by a transparent substrate 10 having a top face 11 oriented towards an observer, the bottom face being designated by the reference 12.

Figure 2:
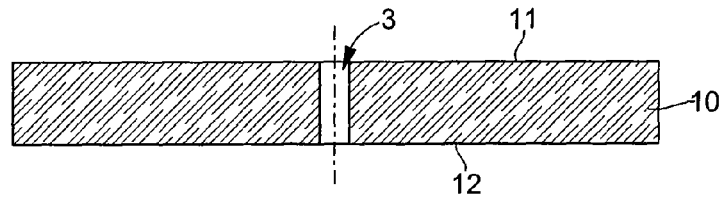
FIGS. 2 to 5 show different steps of a first embodiment along the cross-section IV-IV of FIG. 1.

Transparent substrate 10 shown in FIG. 2 is cut to the dimensions of the dial in a plate whose thickness is comprised between 0.4 and 0.9 mm, the material forming said plate being able to resist temperatures higher than 500° C., preferably temperatures comprised between 700° C. and 1300° C. Substrate 10 is pierced at its centre with a hole 3 for the passage of the pipes of hands 2a, 2b, 2c, by known means, for example using a grinding wheel or via ultrasounds with a sonotrode. Equally, the hole could be made in a last manufacturing step of the dial.

Figure 3:
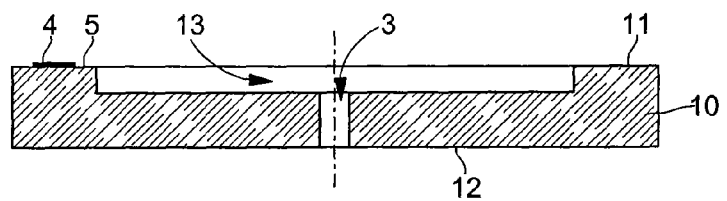

As shown in FIG. 3, a recess 13 corresponding to the disc located inside hour circle 5, is machined in the top face 11 of transparent substrate 10, said recess having for example a depth of 0.2 mm. In the case of a transparent substrate 10 made of sapphire, recess 13 is made by mechanical abrasion (spot facing or etching) with diamondized tools. Depending upon the nature of transparent substrate 10, other machining methods are possible. For example, with a quartz substrate, photochemical machining could be carried out.

As can be seen in FIG. 4, hour circle 5 and recess 13 are covered with enamel layers 23. These enamel layers 23 are obtained by known techniques including several steps consisting of dipping, spraying, fine finishing or screen printing to apply a determined enamel composition, and passing into the furnace after each step in order to obtained the desired thickness. The firing temperature is comprised between 700° C. and 1300° C. depending upon the nature of the enamel composition. In order to prevent a depression in the enamel layers where pipe hole 3 is located, it is possible to provide a provisional heat resistant insert (not shown), for example a ceramic insert, said insert then being removed in the finishing step. The finishing step consists in polishing the two faces with a grinding wheel or a fine grain sandpaper (9 to 15 μm) to attain the desired dimensions, then final firing in the furnace to obtain a glazed finish of the enameled surface.

As can be seen, the layers of enamel 27 located at the centre of the dial are thick, for example 0.4 mm, and can be opaque to light depending upon the pigments in the enamel composition. The hue visible to the observer will thus be that of the enamel. However the enamel layers 25 on the hour circle are thin and sufficiently thin, for example 0.2 mm, for them to be translucent and to enable the subjacent substrate to be seen. If desired, the subjacent substrate can include markings or decorations, such as the hour symbols 4, formed for example by metallizing, prior to the steps for forming the enamel layers. The thin, translucent enamel layer 25 thus enables the indications carried by the hour circle to be read on a background that corresponds to the hue chosen for the enamel. It is of course possible, as has been known for a long time, to affix markings or decorations to the surface of the enamel, or to combine the two possibilities in order to increase the aesthetic choices.

It will also be observed that the same piece manufactured as indicated hereinbefore can present two different aspects to the observer depending upon the way in which dial 1 is mounted in the case. If enamelled face 11 is oriented on the side of the observer, the appearance of opaque zone 27 and translucent zone 25 will be brilliant. If, conversely, the non-enamelled face 12 is oriented on the observer's side, the interface between transparent substrate 10 and layers of enamel 25, 27 will give a more granular appearance. Thus, with the same dial manufacturing line, the invention allows two different collections of wristwatches to be produced.

Figure 5:
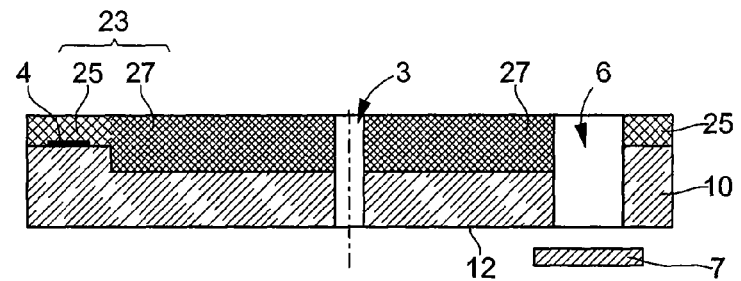

Once the dial is finished, or before the last firing for the glazed finish, it is possible, as shown in FIG. 5, to cut a large through passage forming aperture 6, to make the data carried by date disc 7, or any other support, visible.

Figure 6:
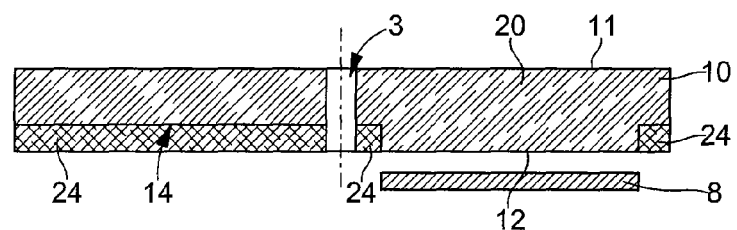
FIG. 6 shows a cross-section of a second embodiment.

With reference now to FIG. 6, a second embodiment is shown in cross-section, which differs from the preceding embodiment in that the transparent monocrystalline substrate 10 is machined on face 12 opposite the face directly visible to an observer. Zones 14 are machined hollow and filled with enamel layers to form a thick opaque layer 24 that does not exceed the hollow machined parts, thus leaving zones 20 free of any enamel coating and thus totally transparent. The contour of these transparent zones 20 can be such that a part of the mechanism, such as a tourbillon schematically represented by the reference 8, is visible.

Figure 7:
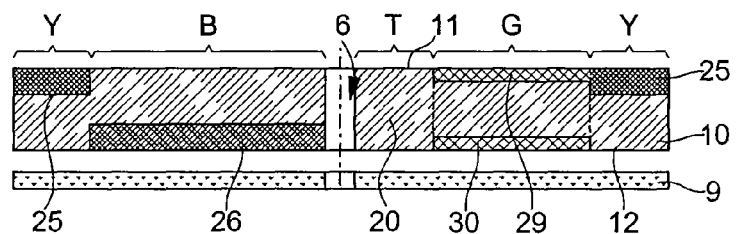
FIG. 7 shows a cross-section of a third embodiment.

FIG. 7 shows a third embodiment which is a kind of synthesis of the previously described embodiments and which includes back lighting symbolised by an electroluminescent sheet 9. the top face 11 oriented towards an observer, is machined hollow to allow the deposition of thin enamel layers 25 and the deposition of ultra-thin enamel layers 29, for example 0.1 mm. Certain zones of top surface 11 are free of enamel depositions and it is assumed that the enamel used has a first colour, for example yellow (Y). The bottom face 12 is also hollow machined to allow depositions of thin enamel 26 and ultra-thin layers 30, the enamel used having a second colour, for example blue (8). In the part located to the left of hand hole 3, the top and bottom enamelled zones 25 and 26 are juxtaposed and the colours visible to an observer will be yellow (Y) and blue (B). The part located to the right of hand hole 3 includes one entirely transparent zone, one zone where top and bottom ultra thin layers 29 and 30 are superposed to give, via a mixture of the two primary colours, the colour green (G), and one zone of the top surface where ultra thin enamel deposition layer 29 is contiguous with thin enamel deposition layer 25.

Figure 8:
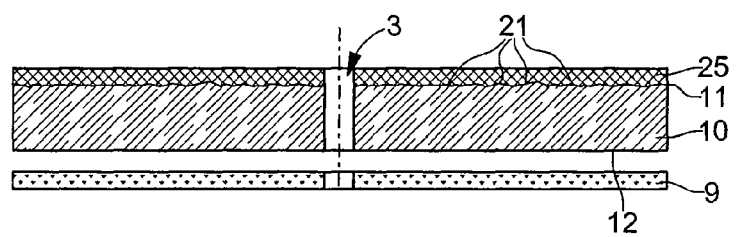
FIG. 8 shows a cross-section of a fourth embodiment.
Figure 10:
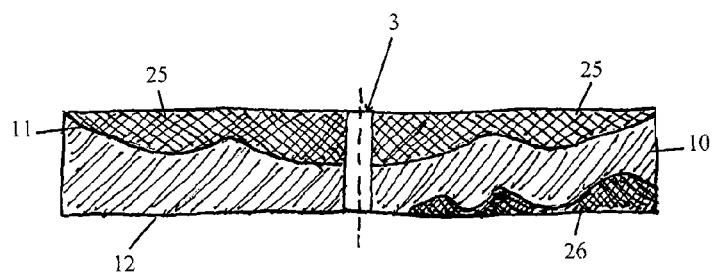
FIG. 10 shows a cross-section of a sixth embodiment.

For better comprehension of the drawings, the thin and ultra thin enamel depositions have been shown with a constant thickness, i.e. with recesses having a bottom parallel to the surfaces of transparent substrate 10. It is clear that there is no technical difficulty in making the bottoms of the recesses with an inclined surface that gradually varies the thickness of the enamel layers. This embodiment, which is shown in FIG. 10, allows hues of the same colour or a gradual change between two different colours when enamel depositions are carried out on both faces of the transparent substrate and have overlapping zones. Likewise, and particularly when one face includes disjointed recesses, it is possible to have more than one enamel colour on the same face, or to create a partitioned enamelled area. FIG. 8 illustrates a fourth embodiment, which can also be combined with the preceding embodiments. In this embodiment, one of the surfaces, top surface 11, has laser structuring 21 forming a hologram, then it is coated with thin enamel layers, said hologram being able to be observed via reflection or transmission if back lighting 9 is provided.

The wristwatch dial has been given solely by way of example, since the use of a piece made according to the invention is not limited to the field of watchmaking. This type of piece can be incorporated in any type of case for which an at least partially transparent panel is desired. It can for example form the fastening glass of the lid of a jewellery box.

Figure 9:
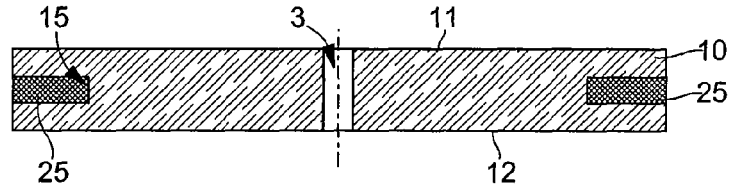
FIG. 9 shows a cross-section of a fifth embodiment.

According to the fifth embodiment shown in FIG. 9, the enamel deposition 25 is carried out in a groove 15 machined in the thickness of the transparent substrate 10, in accordance with the techniques indicated hereinabove. This embodiment has the advantage of making porosity in the enamel mass invisible, so as to facilitate machining and polishing operations, including around the opening of groove 15.

This embodiment can advantageously be combined with the previously described embodiments. The enamel deposited in the groove can for example have a first shade and coincide with the hour circle and recesses, formed on the back face of the dial at the 3 o'clock, 6 o'clock, 9 o'clock and 12 o'clock positions, can be covered with an enamel of a second shade in order to make these time positions more visible.

The invention claimed is:

1. A timepiece with a piece for technical or decorative or technical and decorative use comprising:
   (a) a transparent substrate having a top face, a bottom face and a thickness, wherein the thickness is the distance between the top face and the bottom face;
   (b) a deposit of an enamel material layered in a groove formed in the thickness of the transparent substrate;
   wherein the enamel material is selected from the group of physical characteristics consisting of one or more of opaque, translucent, transparent and coloured, and wherein the transparent substrate is a material that does not experience any heat-induced injury at temperatures higher than 500° C.; and
   wherein the groove does not touch or connect with the top face or the bottom face.

2. The timepiece according to claim 1, wherein the transparent substrate comprises a mono or polycrystalline material.

3. The timepiece according to claim 2, wherein the substrate comprises sapphire.

4. The timepiece according to claim 1, wherein the substrate is an amorphous material.

5. The timepiece according to claim 1, wherein a visible face of the transparent substrate is structured and coated with translucent enamel layers to form a hologram.

6. The timepiece according to claim 1, wherein the piece further comprises a passage passing through both the transparent substrate and the deposit of enamel material.

7. The timepiece according to claim 1, wherein the piece includes back lighting in the zones where the substrate is entirely transparent or includes translucent enamel layers.

8. The timepiece according to claim 7, wherein the back lighting is chosen from among diodes and light emitting elements.

9. The timepiece according to claim 1, wherein the piece is a dial of the timepiece.

10. The timepiece according to claim 1, further comprising a pipe hole formed through a central portion of the transparent substrate.

11. The timepiece according to claim 10, wherein the groove extends radially towards the pipe hole.

12. The timepiece according to claim 1, wherein the a mono or polycrystalline material is selected from the group consisting of quartz, spinelle and corundum.

13. The timepiece according to claim 1, wherein the amorphous material comprises mineral glass.

14. A method of manufacturing a timepiece with a piece for technical or decorative or technical and decorative use including a transparent substrate made of a material resistant to temperature higher than 500° C. at least one face of which or in the thickness of which depositions are carried out formed by opaque, translucent or transparent enamel layers, including the steps of:
   machining a plurality of recesses having an inclined surface that gradually varies in at least a groove in the thickness of the piece;
   filling the plurality of recesses or the groove, via a succession of depositions and firings; and
   polishing the zones including an enamel deposition;
   wherein the groove does not touch or connect with the top face or the bottom face.

15. The method according to claim 14, wherein the material forming the transparent substrate is selected from among materials capable of resisting temperatures higher than 500° C., preferably a temperature comprised between 700° C. and 1300° C.

16. The method according to claim 14, wherein the material forming the transparent substrate is sapphire.

17. A timepiece with a piece for technical or decorative or technical and decorative use comprising:
   a transparent substrate having a top face, a bottom face and a thickness, wherein the thickness is the distance between the top face and the bottom face, wherein there are opaque, translucent or transparent depositions that may or may not be coloured on at least one of the top face and the bottom face or in the thickness,
   wherein the transparent substrate is a material that does not experience any heat-induced injury at temperatures higher than 500° C.,
   wherein the opaque or translucent depositions are formed by enamel layers layered in a groove formed in the thickness of the transparent substrate;
   and
   wherein the transparent substrate includes, on at least one of the top face and the bottom face, a plurality of recesses having an inclined surface that gradually varies a thickness of the enamel layers and acts as a means for varying a hue of a given enamel shade, or making the enamel layers translucent; and
   wherein the groove does not touch or connect with the top face or the bottom face.

18. A timepiece with a piece for technical or decorative or technical and decorative use comprising:
   (a) a transparent substrate having a top face, a bottom face and a thickness, wherein the thickness is the distance between the top face and the bottom face;
   (b) metal coatings including markings or decorations on at least one zone of the transparent substrate; and
   (c) a deposit of an enamel material layered in a groove in the thickness of the transparent substrate;
   wherein the enamel material is selected from the group of physical characteristics consisting of one or more of opaque, translucent, transparent and coloured, and wherein the transparent substrate is a material that does not experience any heat-induced injury at temperatures higher than 500° C.;
   wherein the groove does not touch or connect with the top face or the bottom face.

19. A timepiece with a piece for technical or decorative or technical and decorative use comprising:
   (a) a transparent substrate having a top face, a bottom face and a thickness, wherein the thickness is the distance between the top face and the bottom face;
   (b) a deposit of an enamel material layered in a groove in the thickness thereof; and
   (c) visible symbols disposed on a face of the transparent substrate;
   wherein the enamel material is selected from the group of physical characteristics consisting of one or more of opaque, translucent, transparent and coloured, and wherein the transparent substrate is a material that does not experience any heat-induced injury at temperatures higher than 500° C.;
   wherein the groove does not touch or connect with the top face or the bottom face.

20. A timepiece with a piece for technical or decorative or technical and decorative use comprising:
   (a) a transparent substrate having a top face, a bottom face and a thickness, wherein the thickness is the distance between the top face and the bottom face, wherein there are opaque, translucent or transparent depositions that may or may not be coloured in a groove in the thickness of the transparent substrate, wherein the transparent substrate is a material that does not experience any heat-induced injury at temperatures higher than 500° C., wherein the opaque or translucent depositions are formed by enamel layers, and wherein the transparent substrate includes, on at least one of the faces thereof, recesses for varying a thickness of the enamel layers and acting as means for varying a hue of a given enamel shade, or making the enamel layers translucent; and (b) metal coatings including markings or decorations on certain zones of the transparent substrate and beneath portions of the enamel layers;

wherein the groove does not touch or connect with the top face or the bottom face.

21. A timepiece with a piece for technical or decorative or technical and decorative use comprising:

(a) a transparent substrate having a top face, a bottom face and a thickness, wherein the thickness is the distance between the top face and the bottom face, wherein there are opaque, translucent or transparent depositions that may or may not be coloured in a groove in the thickness of the transparent substrate, (b) visible symbols disposed on a face of the transparent substrate, wherein the transparent substrate is a material that does not experience any heat-induced injury at temperatures higher than 500° C., wherein the opaque or translucent depositions are formed by enamel layers, and wherein the transparent substrate includes on at least one of the surfaces thereof, recesses for varying a thickness of the enamel layers and act as means for varying a hue of a given enamel shade, or making said enamel layers translucent;

wherein the groove does not touch or connect with the top face or the bottom face.

22. A timepiece with a piece for technical or decorative or technical and decorative use comprising:

a transparent substrate having a top face, a bottom face and a thickness, wherein the thickness is the distance between the top face and the bottom face, wherein there are opaque, translucent or transparent depositions that may or may not be coloured in a groove in the thickness, wherein the transparent substrate is a material that does not experience any heat-induced injury at temperatures higher than 500° C., wherein the opaque or translucent depositions are formed by enamel layers, and wherein the transparent substrate includes, on at least one of the top face and the bottom face, a plurality of recesses having a surface that varies a thickness of the enamel layers and acts as a means for varying a hue of a given enamel shade, or making the enamel layers translucent;

wherein the groove does not touch or connect with the top face or the bottom face.

* * * * *